(12) United States Patent
Liu et al.

(10) Patent No.: US 8,156,860 B2
(45) Date of Patent: Apr. 17, 2012

(54) GRILL WITH STORAGE SPACE FOR COOKING PLATE

(75) Inventors: Tachi Liu, Tainan (TW); Chunhua Li, Fujian (CN)

(73) Assignee: Tsann Kuen (China) Enterprise Co., Ltd., Xiamen, Fujian (CN)

( * ) Notice: Subject to any disclaimer, the term of this patent is extended or adjusted under 35 U.S.C. 154(b) by 472 days.

(21) Appl. No.: 12/397,372

(22) Filed: Mar. 4, 2009

(65) Prior Publication Data

US 2009/0223381 A1    Sep. 10, 2009

(30) Foreign Application Priority Data

Mar. 4, 2008    (CN) ............... 2008 2 0101561 U

(51) Int. Cl.
*A47J 37/00*    (2006.01)
*A47J 37/04*    (2006.01)

(52) U.S. Cl. .................. 99/372; 99/379
(58) Field of Classification Search ............ 99/372, 99/376

See application file for complete search history.

(56) References Cited

U.S. PATENT DOCUMENTS

| | | | | |
|---|---|---|---|---|
| 2,496,705 A | * | 2/1950 | Farr et al. ............... | 99/376 |
| 2,899,888 A | * | 8/1959 | Koci ........................ | 99/331 |
| 3,172,999 A | * | 3/1965 | Sutton et al. ............ | 219/524 |
| 4,150,609 A | * | 4/1979 | McClean .................. | 99/372 |
| 5,945,024 A | * | 8/1999 | Fukunaga et al. ....... | 219/757 |
| 6,487,963 B1 | * | 12/2002 | Wu .......................... | 99/340 |
| 6,889,602 B2 | * | 5/2005 | Brady et al. ............. | 99/378 |
| 2010/0050883 A1 | * | 3/2010 | Kuo ......................... | 99/376 |

* cited by examiner

*Primary Examiner* — William Pierce
(74) *Attorney, Agent, or Firm* — Kening Li; Pinsent Masons LLP

(57) ABSTRACT

A grill comprising a lower cooking unit and an upper cooking unit, the lower cooking unit comprising a lower shell and a lower cooking plate detachably mounted on said lower shell, the upper cooking unit comprising an upper shell and an upper cooking plate detachably mounted on said upper shell, wherein the lower shell has a storing unit for storing the plates. The present invention further comprises a storing unit, so when the equipped plates are not in use, they can be stored in the storing unit after being cleaned.

11 Claims, 3 Drawing Sheets though the exemplary embodiments of the present invention have been described in some detail above, those skilled in the art will readily appreciate that many modifications are possible without materially departing from the novel teachings and advantages of this invention.

GRILL WITH STORAGE SPACE FOR COOKING PLATE

CROSS REFERENCE TO RELATED APPLICATIONS

This application claims priority to Chinese application No.: 200820101561.0, filed on Mar. 4, 2008, the entire disclosure of which is incorporated herein by reference.

FIELD OF THE INVENTION

The present invention relates to a grill and, more particularly, to a grill with a storing unit for the plate.

BACKGROUND OF THE INVENTION

Traditional grills comprise a lower cooking unit and an upper cooking unit, the lower cooking unit comprises a lower shell and a lower cooking plate detachably mounted on the lower shell, the upper cooking unit comprises an upper shell and an upper cooking plate detachably mounted on the upper shell. Usually, the traditional grills further equipped with several plates for using. These equipped plates can not be stored within the grill, and that cause the following disadvantage: first, the equipped plates occupy much space; second, the plates are easy to be fouled. Both of these will cause inconvenience to the users.

SUMMARY OF THE INVENTION

The primary object of the invention is to provide a grill to obviate the disadvantages that there is not any storing unit in the traditional grills.

The object of the invention is achieved by providing:

A grill comprising a lower cooking unit and an upper cooking unit, the lower cooking unit comprising a lower shell and a lower cooking plate detachably mounted on said lower shell, the upper cooking unit comprising an upper shell and an upper cooking plate detachably mounted on said upper shell, and the lower shell has a storing unit.

In a preferred embodiment of the present invention, there are two symmetrical feet in the bottom of said lower shell; the storing unit comprising two grooves arranged in the opposite sides of the two feet respectively, and the two grooves are mounted bilateral symmetry.

In a preferred embodiment of the present invention, the grooves extend through the front surfaces of the feet.

In a preferred embodiment of the present invention, the storing unit further comprising a horizontal supporting portion disposed between the feet for supporting the plate.

In a preferred embodiment of the present invention, the storing unit further comprising a rear bar disposed between the feet.

In a preferred embodiment of the present invention, the inner surface of the groove has protrusion portions.

In a preferred embodiment of the present invention, the top surface of the horizontal supporting portion has protrusion portions.

In a preferred embodiment of the present invention, the protrusion portions are spherical shape.

In a preferred embodiment of the present invention, the protrusion portions are ribs.

In a preferred embodiment of the present invention, the front portions of the feet are extending outwardly from the lower cooking unit.

In a preferred embodiment of the present invention, the grill further comprising a lever which connected the lower cooking unit with the upper cooking unit.

Compared with the prior arts, the present invention has a storing unit, so when the equipped plates are not in use, they can be stored in the storing unit after being cleaned. Thus the present invention has the following advantages: the plates which are not in use can be stored in the grill to save room, and the plates can be prevented from being placed everywhere, and the plates can be drawn out in any time when needed. The protrusion portions of the grooves and the horizontal supporting portion make it convenient for taking and storing the plates and the horizontal supporting portion support the plates stably.

BRIEF DESCRIPTION OF THE DRAWINGS

The preferred embodiment of the invention can be better understood with reference to the following drawings.

DETAILED DESCRIPTION OF EXEMPLARY EMBODIMENTS

Figure 1:
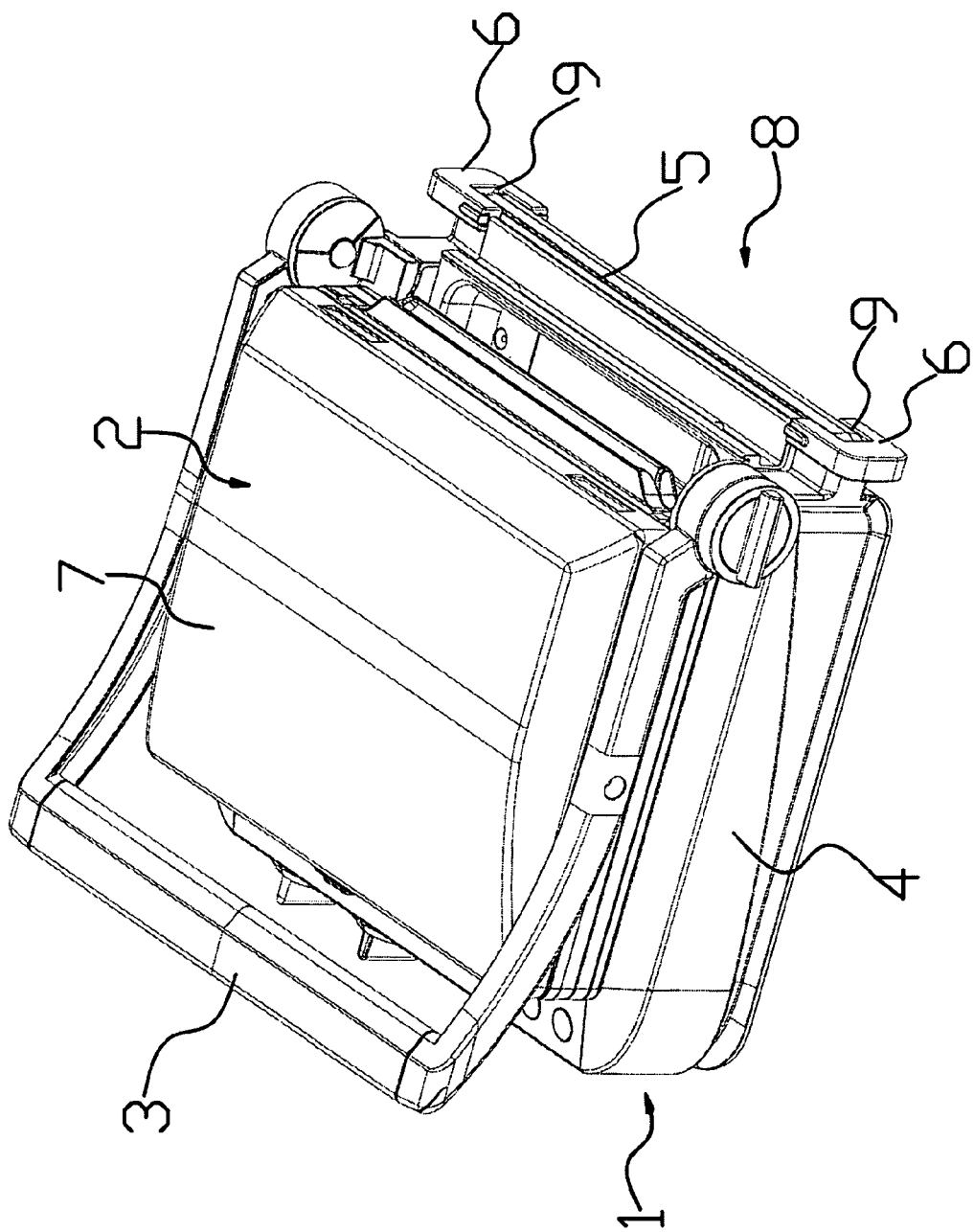
FIG. 1 is a perspective view of the present invention grill in a preferred embodiment, herein the plate is in storing status.
Figure 2:
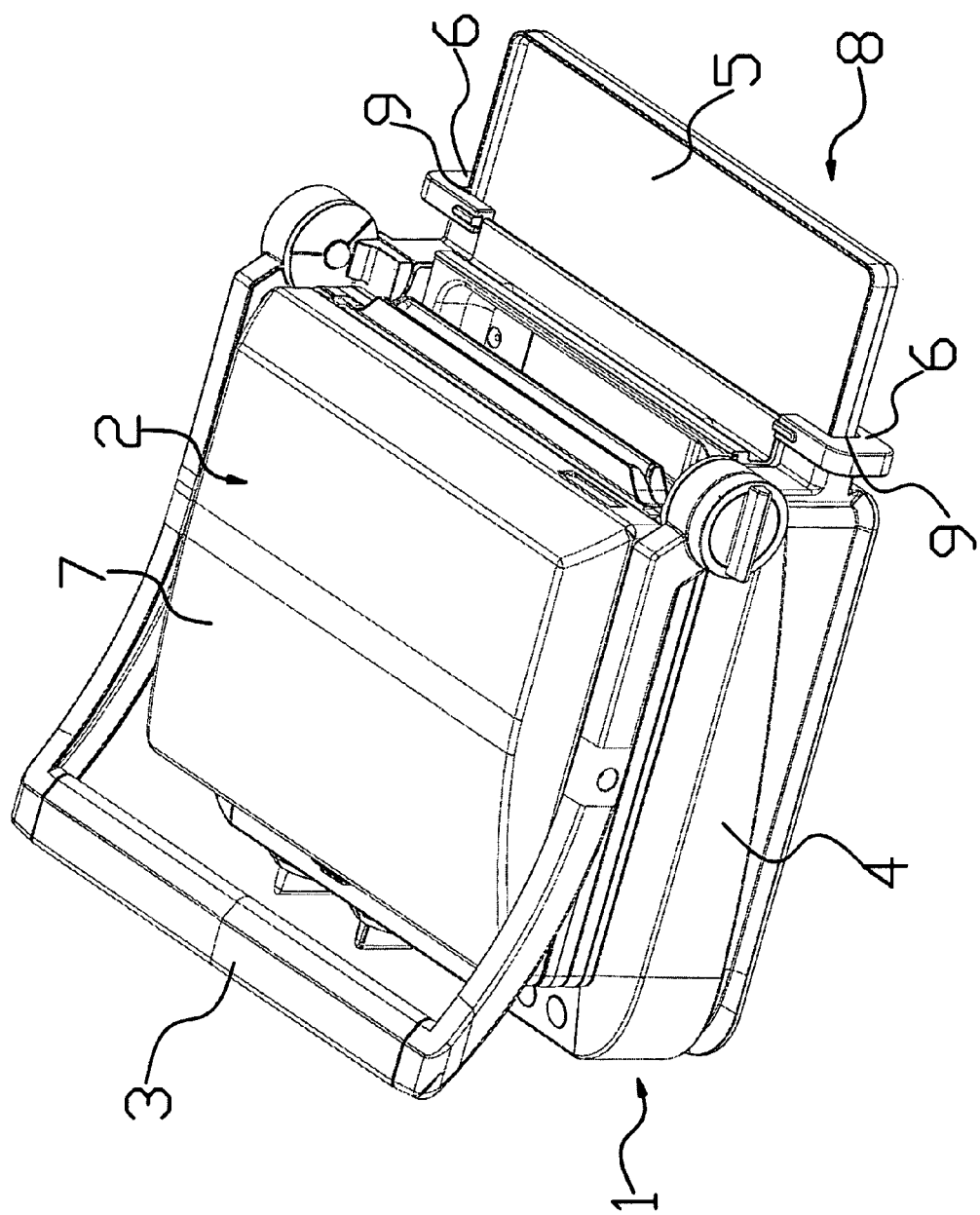
FIG. 2 is another perspective view of the present invention grill in a preferred embodiment, herein the plate is drawn out.
Figure 3:
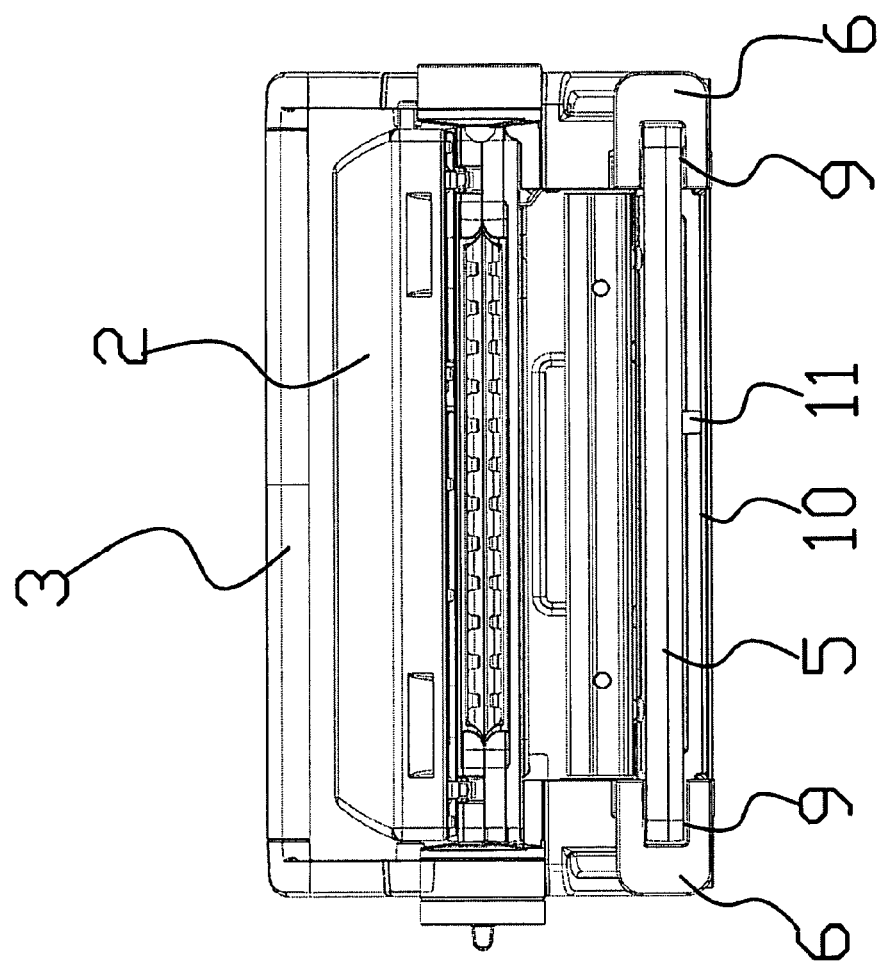
FIG. 3 is a rear view of the present invention grill in a preferred embodiment.

Referring to FIG. 1, FIG. 2 and FIG. 3, a grill comprises a lower cooking unit 1, an upper cooking unit 2 and a lever 3, the lever 3 connecting the lower cooking unit 1 and the upper cooking unit 2. The lower cooking unit 1 comprising a lower shell 4 and a lower cooking plate 5 detachably mounted on the lower shell 4, two symmetrical feet 6 disposed in the bottom of the lower shell 4, the upper cooking unit 2 comprising an upper shell 7.

A storing unit 8 for storing the lower plate 5 is disposed in the bottom of the lower shell 4, the storing unit 8 comprising two symmetrically-opened, U-shaped grooves 9 and a horizontal supporting portion 10.

The two grooves 9 arranged in the opposite sides of the feet 6 respectively. The front ends of the grooves 9 extend through the front surface of the feet 6, without passing through the rear surface of the feet 6, thus the lower cooking plate 5 can be put into the storing unit 8 through the front end, and the rear ends of the feet 6 can be the rear bar of the grooves 9. Herein the front ends of the feet 6 are extending from the lower shell 4 for the convenience of storing and taking out of the lower cooking plate 5 by the users.

The horizontal supporting portion 10 disposed between the feet 6, and there are several parallel protrusion portions 11 on the end of the horizontal supporting portion 10, the top surfaces of the protrusion portions 11 are flush with the bottom of the groove 9. Herein the horizontal supporting portion 10 can be a horizontal plate or parallel ribs.

When in storing, the plate 5 can be inserted into the storing unit 8 along the grooves 9, and the upper-to-lower interval of the groove 9 is slightly greater than the thickness of the plate 5, the utmost distance of the two groove 9 is slightly greater than the length of the left-to-right of the plate 5.

Having thus described the exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A grill, comprising: an upper cooking unit comprising an upper shell and an upper cooking plate detachably mounted on said upper shell; and a lower cooking unit comprising a lower shell and a lower cooking plate detachably mounted on said lower shell, wherein said lower shell has a storing unit for storing the lower cooking plate, wherein said lower shell further comprises at least two feet mounted symmetrically and on opposite sides under the lower shell, and wherein said storing unit comprises two U-shaped grooves on said at least two feet, wherein the two U-shaped grooves face each other and form a storage space into which the lower cooking plate may be inserted.

2. The grill according to claim 1, wherein each of the at least two feet has a surface facing each other, and each of said grooves respectively passes through the surface facing each other of said feet.

3. The grill according to claim 1, wherein said storing unit further comprises a horizontal supporting portion disposed between said feet and forms a bottom support of the storing unit.

4. The grill according to claim 1, wherein said storing unit further comprises a rear bar disposed between said feet.

5. The grill according to claim 1, wherein said grooves comprises at least one protrusion portion disposed in the inner surface of said U-shaped groove.

6. The grill according to claim 3, wherein said horizontal supporting portion comprises at least one protrusion portion disposed on its top surface.

7. The grill according to claim 5, wherein said protrusion portion is of a spherical shape.

8. The grill according to claim 5, wherein said protrusion portion is a rib.

9. The grill according to claim 6, wherein said protrusion portion is of a spherical shape.

10. The grill according to claim 6, wherein said protrusion portion is a rib.

11. The grill according to claim 1, wherein each of said two feet comprises a front portion extending from said lower cooking unit.

* * * * *